(12) United States Patent
Wilhelmsson et al.

(10) Patent No.: US 12,075,472 B2
(45) Date of Patent: Aug. 27, 2024

(54) LATENCY CONTROL

(71) Applicant: Telefonaktiebolaget LM Ericsson (publ), Stockholm (SE)

(72) Inventors: Leif Wilhelmsson, Lund (SE); Guido Roland Hiertz, Aachen (DE); Luis Felipe Del Carpio Vega, Espoo (FI); Vicknesan Ayadurai, Sollentuna (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 619 days.

(21) Appl. No.: 17/425,727

(22) PCT Filed: Feb. 7, 2019

(86) PCT No.: PCT/EP2019/053009
§ 371 (c)(1),
(2) Date: Jul. 25, 2021

(87) PCT Pub. No.: WO2020/160774
PCT Pub. Date: Aug. 13, 2020

(65) Prior Publication Data
US 2022/0167403 A1    May 26, 2022

(51) Int. Cl.
*H04W 74/0808* (2024.01)
*H04W 28/02* (2009.01)

(52) U.S. Cl.
CPC ... *H04W 74/0808* (2013.01); *H04W 28/0268* (2013.01)

(58) Field of Classification Search
CPC .............. H04W 28/0268; H04W 74/0808
See application file for complete search history.

(56) References Cited

U.S. PATENT DOCUMENTS

| 2004/0095911 A1 | 5/2004 | Benveniste et al. |
| 2011/0007703 A1 | 1/2011 | He et al. |
| 2018/0220457 A1 | 8/2018 | Koorapaty et al. |

FOREIGN PATENT DOCUMENTS

| CN | 106465288 A | 2/2017 | |
| JP | 2016029839 A | 3/2016 | |
| WO | WO-2017030491 A1 * | 2/2017 | ............ H04W 24/02 |

OTHER PUBLICATIONS

Chinese Office Action with English translation issued Oct. 28, 2023 in connection with Chinese Application No. 201980091457.9, 6 pages.

(Continued)

*Primary Examiner* — Brian P Cox
(74) *Attorney, Agent, or Firm* — Leffler Intellectual Property Law, PLLC (57) ABSTRACT

Disclosed is a latency control method of a transmitter apparatus adapted for transmission of a plurality of packets under clear channel assessment requirements and latency requirements. The method comprises determining a maximum required time for clear channel assessment for the plurality of packets and determining a duration of time related to the determined maximum required time. For example, the duration of time may be determined as being equal to the determined maximum required time for clear channel assessment plus an offset. The offset may be equal to zero, or may be equal to a positive value. In some embodiments, the offset may be equal to, or larger than, a duration of another packet (which is not comprised in the plurality of packets). The method also comprises enforcing, for each packet of the plurality of packets, the determined duration of time to elapse after completion of transmission of the packet, before transmission of a subsequent packet of the plurality of packets is initiated. Corresponding latency (Continued)

control apparatus, transmitter apparatus, communication device and computer program product are also disclosed.

32 Claims, 3 Drawing Sheets

(56) References Cited

OTHER PUBLICATIONS

PCT International Search Report, mailed Oct. 25, 2019, in connection with International Application No. PCT/EP2019/053009, all pages.
PCT Written Opinion, mailed Oct. 25, 2019, in connection with International Application No. PCT/EP2019/053009, all pages.
Yong He et al., "Deterministic Backoff: Toward Efficient Polling for IEEE 802.11e HCCA in Wireless Home Networks" IEEE Transactions on Mobile Computing, vol. 10, No. 12, Dec. 2011, pp. 1726-1740.
Unknown, IEEE Std 802.11-2016, IEEE Standard for Information Technology—Local and Metropolitan Area Networks—Specific Requirements, Part 11: Wireless LAN MAC and PHY Specifications, 2016, Section 10.2, pp. 1295-1303.
Janos Farkas, Introduction to IEEE 802.1, "Focus on the Time-Sensitive Networking Task Group", May 15, 2017, 50 pages.
Unknown, IEEE P802.11ax/D2.0, Section 27.5.5.2, Oct. 2017, pp. 257-260.
Japanese Office Action issued Jul. 26, 2022 in connection with Japanese Application No. 2021-545457, 4 pages.
English language translation of Japanese Office Action issued Jul. 26, 2022 in connection with Japanese Application No. 2021-545457, 4 pages.
Huawei, HiSilicon. "Discussion on Uu-based sidelink resource allocation/configuration." 3GPP TSG RAN WG1 adhoc_NR_AH_ 1901 R1-1900028, 3GPP, Jan. 12, 2019, 15 pages.
Huawei, HiSilicon. "Coexistence and channel access for NR unlicensed band operations." 3GPP TSG RAN WG1 #95 R1-1812194, 3GPP, Nov. 3, 2018, 15 pages.
Huawei, HiSilicon. "Coexistence and channel access for NR unlicensed band operations." 3GPP TSG RAN WG1 #94b R1-1810126, 3GPP, Sep. 29, 2018, 15 pages.
ZTE. "Enhancement for UL grant-free transmissions." 3GPP TSG RAN WG1 #95 R1-1812390, 3GPP, Nov. 3, 2018 (cited to demonstrate conventional art), 11 pages.
Ericsson. "Scenario for coordination of max latency between the application and the network." 3GPP TSG-SA WG2#106 S2-143938, 3GPP, Nov. 11, 2014 (cited to demonstrate conventional art), 4 pages.
Huawei, HiSilicon. "Coexistence and channel access for NR unlicensed band operation." 3GPP TSG RAN WG1 #90 R1-1713785, 3GPP, Aug. 12, 2017 (cited to demonstrate conventional art), 7 pages.

\* cited by examiner

LATENCY CONTROL

TECHNICAL FIELD

The present disclosure relates generally to the field of wireless communication. More particularly, it relates to latency control for wireless communication.

BACKGROUND

When a plurality of packets are transmitted under clear channel assessment (CCA) requirements, there is an inherent variation in latency between the packet transmissions. This variation is due to that the CCA procedure has a built-in duration variation, as is well known in the art. Examples of transmission under clear channel assessment requirements include environments where a listen-before-talk—LBT, a.k.a. carrier sense multiple access with collision avoidance, CSMA/CA—procedure is enforced, e.g. transmission in accordance with the IEEE802.11 standard.

In some communication situations, however, it may be important (e.g., required) that such latency variation (jitter) is not too large, or that there is no latency variation at all. Furthermore, it may—alternatively or additionally—be important (e.g., required) that the absolute latency is not too large. Adherence to such latency requirements may be cumbersome (or even impossible) to guarantee in relation to typical approaches to transmission of a plurality of packets under clear channel assessment.

Therefore, there is a need for approaches to transmission of a plurality of packets under both clear channel assessment requirements and latency requirements.

SUMMARY

It should be emphasized that the term "comprises/comprising" (replaceable by "includes/including") when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Generally, when an arrangement is referred to herein, it is to be understood as a physical product; e.g., an apparatus. The physical product may comprise one or more parts, such as controlling circuitry in the form of one or more controllers, one or more processors, or the like.

It is an object of some embodiments to solve or mitigate, alleviate, or eliminate at least some of the above or other disadvantages.

A first aspect is a latency control method of a transmitter apparatus adapted for transmission of a plurality of packets under clear channel assessment requirements and latency requirements.

The method comprises determining a maximum required time for clear channel assessment for the plurality of packets, and determining a duration of time related to the determined maximum required time.

The method also comprises enforcing, for each packet of the plurality of packets, the determined duration of time to elapse after completion of transmission of the packet, before transmission of a subsequent packet of the plurality of packets is initiated.

In some embodiments, the method further comprises transmitting the subsequent packet of the plurality of packets when the determined duration of time has elapsed.

In some embodiments, enforcing the determined duration of time to elapse after completion of transmission of the packet comprises enforcing at least one silent period of the transmitter apparatus while the determined duration of time elapses.

In some embodiments, the method further comprises initiating a clear channel assessment procedure at the completion of transmission of the packet.

In some embodiments, determining the duration of time related to the determined maximum required time comprises negotiating, with an intended receiver of the plurality of packets and based on determined maximum required time, a duration for each of the packets of the plurality of packets and/or a periodicity of transmission for the packets of the plurality of packets.

In some embodiments, the latency requirements comprise requirements of a maximum latency variation.

In some embodiments, the maximum required time is determined as a sum of a deterministic initial time period for clear channel assessment and a maximum possible subsequent time period for clear channel assessment.

In some embodiments, the clear channel assessment comprises drawing an integer number from an interval ranging from zero to a maximum integer number, and the maximum possible subsequent time period equals the maximum integer number multiplied by a slot duration.

In some embodiments, at least one of the deterministic initial time period and the maximum possible subsequent time period is specified in relation to a clear channel assessment access category of the plurality of packets.

In some embodiments, the duration of time is determined as being equal to the determined maximum required time plus an offset.

In some embodiments, the offset is equal to zero, or is equal to a positive value.

In some embodiments, the offset is equal to, or larger than, a duration of another packet, wherein the other packet is not comprised in the plurality of packets.

In some embodiments, the method further comprises transmitting the other packet while the determined duration of time elapses.

In some embodiments, the method further comprises transmitting, for provision to another transmitter apparatus and for controlling transmission of the other packet by the other transmitter apparatus, one or more of: an indication of the determined duration of time, an indication of the duration of the other packet, an indication of duration for each of the packets of the plurality of packets, and an indication of periodicity of transmission for the packets of the plurality of packets.

A second aspect is a computer program product comprising a non-transitory computer readable medium, having thereon a computer program comprising program instructions. The computer program is loadable into a data processing unit and configured to cause execution of the method according to the first aspect when the computer program is run by the data processing unit.

A third aspect is a latency control apparatus for a transmitter apparatus adapted for transmission of a plurality of packets under clear channel assessment requirements and latency requirements.

The apparatus comprises controlling circuitry configured to cause determination of a maximum required time for clear channel assessment for the plurality of packets, determination of a duration of time related to the determined maximum required time, and enforcement, for each packet of the plurality of packets, of the determined duration of time to elapse after completion of transmission of the packet, before transmission of a subsequent packet of the plurality of packets is initiated.

A fourth aspect is a transmitter apparatus comprising the apparatus of the third aspect.

A fifth aspect is a communication device comprising the apparatus of the third aspect and/or the transmitter apparatus of the fourth aspect.

In some embodiments, any of the above aspects may additionally have features identical with or corresponding to any of the various features as explained above for any of the other aspects.

An advantage of some embodiments is that transmission of a plurality of packets under both clear channel assessment requirements and latency requirements is enabled.

Another advantage of some embodiments is that control of the latency variation (jitter) may be achieved. For example, the latency variation can be kept below a latency variation threshold value, or the latency may be controlled such that there is no latency variation.

According to some embodiments, wireless transmissions under clear channel assessment requirements become predictable. This enables other devices to better align their transmissions.

Furthermore, some embodiments provide power savings at the receiver, since it needs only to be turned on during the predictable intervals (e.g., at the predictable times) for packet arrival.

BRIEF DESCRIPTION OF THE DRAWINGS

Further objects, features and advantages will appear from the following detailed description of embodiments, with reference being made to the accompanying drawings. The drawings are not necessarily to scale, emphasis instead being placed upon illustrating the example embodiments.

DETAILED DESCRIPTION

As already mentioned above, it should be emphasized that the term "comprises/comprising" (replaceable by "includes/including") when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Embodiments of the present disclosure will be described and exemplified more fully hereinafter with reference to the accompanying drawings. The solutions disclosed herein can, however, be realized in many different forms and should not be construed as being limited to the embodiments set forth herein.

When latency is referred to herein, it should be understood as encompassing any suitable time measure. For example, latency may refer to the time interval between packet transmissions of a plurality of packets (a periodicity of packet transmissions).

As mentioned above, there is typically a variation in the time between packet transmissions when a plurality of packets are transmitted under clear channel assessment (CCA) requirements, which is due to that the CCA procedure has a built-in duration variation. This variation may be problematic in applications where it is important that such latency variation (jitter) is not too large, or that there is no latency variation at all, which results in a need for approaches to transmission of a plurality of packets under both clear channel assessment requirements and latency requirements. In some scenarios, the need may be formulated as a need to make transmission over a wireless channel become as deterministic (predictable) as possible while remaining compliant with a CCA process.

In the following, embodiments will be described where such approaches are provided.

It should be noted that embodiments presented herein are equally applicable to transmission of a plurality of packets under any combination of CCA requirements with latency requirements, even if exemplified herein by a scenario where time sensitive networking (TSN) is residing in an LBT environment according to the IEEE802.11 standard. TSN, WLAN and CCA are well known in the art, but will nevertheless be briefly introduced below.

One way of reducing the latency variation is to apply TSN. TSN is an enhanced Ethernet technology which provides guaranteed data transport with bounded low latency, low delay variation, and extremely low loss. TSN includes a set of components such as synchronization, reliability, latency and resource management. There are several standards related to these components, as is well known. In addition to TSN, embodiments may be equally applicable to other industrial Ethernet standards, such as PROFINET.

Wireless Local Area Network (WLAN; commonly known as Wi-Fi) is a wireless communication system most often operating in license-exempt frequency bands (such as, for example, Industrial Scientific and Medical (ISM) frequency bands) and is specified by the IEEE802.11 standard. There are several versions of the standard (e.g., IEEE802.11a, IEEE802.11b, IEEE802.11n, IEEE802.11ac, and IEEE802.11ax). A WLAN setup is usually deployed in a star topology where the Access Point (AP) is a device having a coordinator node and the stations (STAs) are associated to one or more APs.

The WLAN system uses a hybrid coordination function (HCF), which consists of enhanced distributed channel access (EDCA) and HCF controlled channel access (HCCA). EDCA allows STAs to gain access to the wireless medium via a listen-before-talk (LBT) procedure. This procedure is also known as clear channel assessment (CCA).

The CCA process according to current WLAN standards is divided in two-time stages. In the first stage, an interframe spacing (IFS) time is selected for an access category in the EDCA access; this is referred to as arbitration IFS (AIFS). If the wireless medium is found idle during the AIFS time, the second stage starts. The second stage comprises a back-off (BO) period. The back-off time is computed by multiplying the fixed slot duration with a random value drawn from a uniform distribution in the range [0, CW], where CW is a value in the range [aCWmin, aCWmax]. A back-off counter is initiated with the random value drawn and is decreased if the wireless medium is idle during a back-off slot. When the back-off counter reaches zero, a frame may be transmitted.

When a STA transmits a first packet, it will typically start the CCA process when the first packet is available for transmission. Then, once any packet has been transmitted STA starts the CCA process immediately after the packet transmission is completed. The packet transmission may be considered completed, for example, when an acknowledgement signal (ACK) is received or when the time-out interval for ACK has elapsed. The requirement to perform a CCA process (including back-off) after each packet transmission, whether or not another packet is queued for transmission, is commonly referred to as post back-off.

Latency jitter is usually defined as the latency (or delay) variation. In WLAN (assuming that packets are available for transmission at specific intervals) a jitter value can be calculated based on the variations of when the packets are transmitted in relation to each other. The jitter in a WLAN system depends on the traffic load. For a heavily loaded system, it may take a significant time before the channel is found to be idle so that a packet can be transmitted. The jitter in a WLAN system also depends on periodicity of packets for transmission. The less time between packets, the larger the risk that the post back-off procedure will not be finalized when there is a new packet to be transmitted. In such situations, there may be additional delay and the transmission jitter will typically increase consequently.

Thus, the clear channel assessment of Wi-Fi typically introduces a latency variation (latency jitter), and the jitter cannot generally be limited to a relatively low value (as required by TSN, for example) in the context of CCA.

In order to support time sensitive networking (TSN) using standard wireless protocols (e.g. IEEE802.11) it is beneficial if there is no, or negligible, uncontrolled interference. With a lot of uncontrolled interference the channel access cannot be guaranteed because of the regulatory rules related to LBT. Furthermore, even if a transmitter determines that the channel is idle and therefore is allowed to transmit, it may very well be so that there is strong interference at the receiver which hinders reception and/or decoding.

In absence of interference, a STA can be allowed to transmit at a specific instant of time provided that the instant of time is sufficiently distant from the completion of an earlier transmission, such that the post back-off CCA procedure is certainly finalized before the instant of time (e.g., such that the counter involved in the CCA procedure has reached zero irrespectively of what random number has been drawn).

Therefore, a particularly interesting application of some embodiments is in the context of communication environments where interference is controlled (at least to some extent). Some industrial applications (e.g., factory premises) provide such a context. A type of traffic present in industrial applications is periodic traffic, for example, in process automation where sensor reports and actuation commands are created periodically. When serving periodic traffic, the delay variation (latency variation, latency jitter) of served packets typically needs to be kept low.

Figure 1:
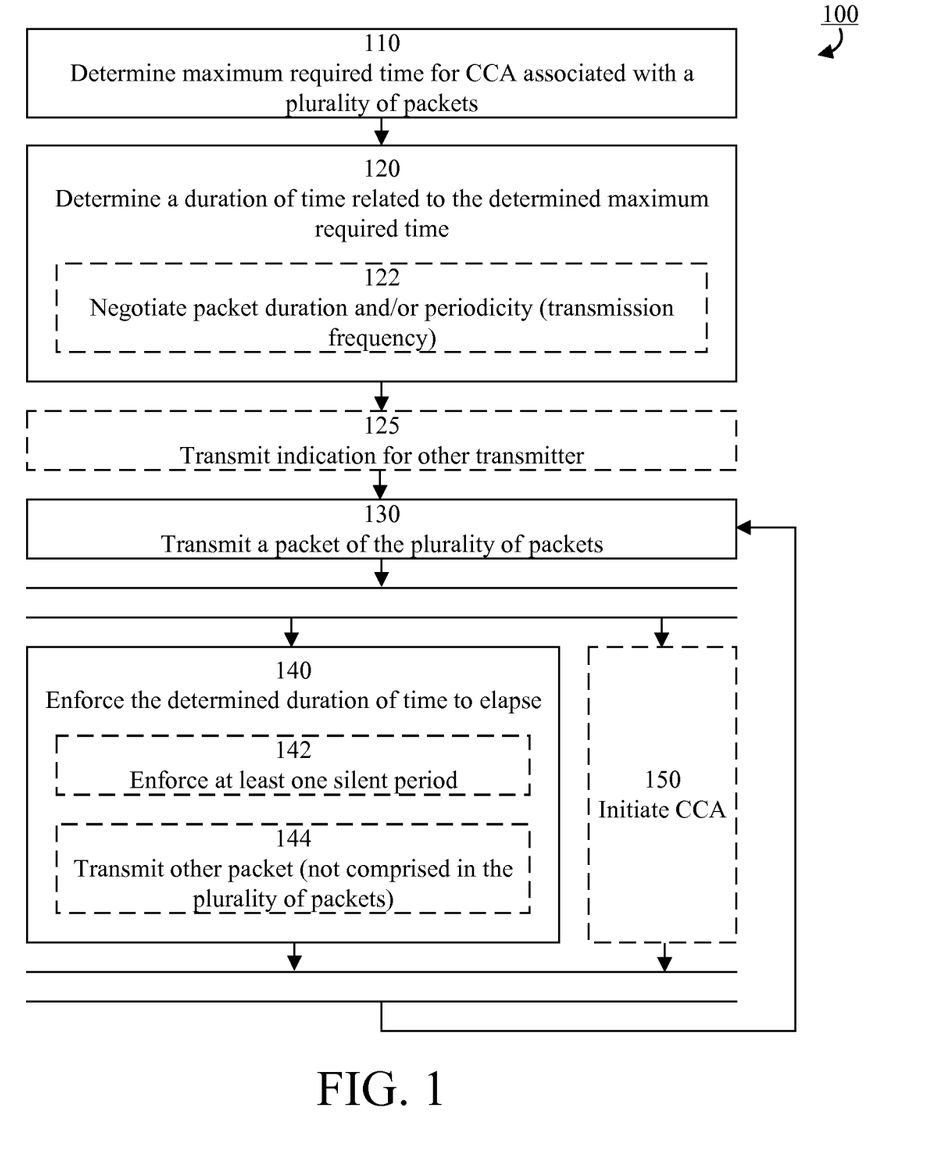
FIG. 1 is a flowchart illustrating example method steps according to some embodiments.

FIG. 1 illustrates an example latency control method 100 according to some embodiments. The method 100 may be performed by a transmitter apparatus adapted for transmission of a plurality of packets under clear channel assessment (CCA) requirements and latency requirements (e.g., limited or no latency variation). The transmitter apparatus may, for example, be an access point (AP) or a station (STA).

The latency requirements may comprise requirements of a maximum (acceptable) latency variation. The maximum latency variation may be zero (no variation accepted) or a positive value.

Thus, the method 100 is typically adapted to control latency variation (latency jitter). For example, application of the method may result in predictable/predetermined (e.g., periodic) packet transmission times in an environment with CCA requirements. The method 100 may be further adapted to control latency such that a maximum acceptable latency requirement is adhered to. The maximum latency variation and/or the maximum acceptable latency may be specified in the context of (e.g., defined by) an applicable time sensitive networking approach.

In step 110, a maximum required time for clear channel assessment is determined for the plurality of packets.

In some scenarios, the maximum required time for CCA may depend on characteristics (e.g., access category such as according to the IEEE802.11 standard) of the plurality of packets.

The maximum required time for CCA may be determined as a sum of a deterministic initial time period for clear channel assessment (e.g., arbitration inter-frame spacing—AIFS—according to the IEEE802.11 standard, or distributed inter-frame space—DIFS—for distributed coordination function) and a maximum possible subsequent time period for clear channel assessment; the subsequent time period for clear channel assessment being non-deterministic. When (e.g., as according to the IEEE802.11 standard) the clear channel assessment comprises (randomly or pseudo-randomly) drawing an integer number (commonly denoted by N or RND) from an interval ranging from zero to a maximum integer number (commonly denoted by CW), the maximum possible subsequent time period may equal the maximum integer number multiplied by a slot duration (or any other suitable time unit). The deterministic initial time period and/or the maximum possible subsequent time period (e.g., the maximum integer number) may be specified in relation to a clear channel assessment access category of the plurality of packets.

Generally, the maximum required time for clear channel assessment may be defined as the minimum possible time in which it can be guaranteed that any CCA procedure for the plurality of packets can be completed assuming that the channel is idle (e.g., regardless of which integer number is drawn, if applicable).

In step 120, a duration of time related to the determined maximum required time is determined. For example, the duration of time may be determined as being equal to the determined maximum required time plus an offset.

The offset may be equal to zero in some embodiments (i.e., the duration of time is equal to the maximum required time for CCA; the maximum required time for CCA fits exactly within the duration of time).

In some embodiments, the offset may be equal to a positive value (i.e., the duration of time is larger/longer than the maximum required time for CCA; the maximum required time for CCA fits within the duration of time with slack). As will be elaborated on later herein, this slack (the part of the duration of time that is not needed for CCA) may be utilized to interleave, between packets of the plurality, transmission of one or more other packets (which are not comprised in the plurality of packets).

Determining, in step 120, the duration of time related to the determined maximum required time may comprise negotiating, with an intended receiver of the plurality of packets and based on determined maximum required time, a (packet) duration for each of the packets of the plurality of packets (e.g., a maximum allowed packet length) and/or a periodicity of transmission for the packets of the plurality of packets (e.g., a maximum allowed packet frequency), as illustrated by optional sub-step 122.

For example, the periodicity may be determined in the negotiation based on the determined maximum required time of the transmitter apparatus and a packet duration specified by receiver requirement, or the packet duration may be determined in the negotiation based on the determined maximum required time of the transmitter apparatus and a periodicity specified by receiver requirement, or the packet duration and the periodicity may be jointly determined in the negotiation based on the determined maximum required time of the transmitter apparatus.

Generally, the negotiation may be subject to latency variation requirements (e.g., according to applicable TSN).

As mentioned above, there is some slack within the duration of time determined in step 120 after accommodation of the maximum required time for CCA when the offset is equal to a positive value. When the offset is equal to, or larger than, a duration of another packet (which is not comprised in the plurality of packets), the slack can be utilized to accommodate the other packet between the transmission of packets of the plurality.

The other packet may be a single packet or may be comprised in another plurality of packets (which may or may not be subject to requirements regarding latency requirements).

When the other packet is to be transmitted by another device (another transmitter apparatus) than the transmitter apparatus performing the method 100, the method may comprise transmitting an indication for provision to the other transmitter apparatus as illustrated by optional step 125.

The indication may, for example, be transmitted separately as illustrated in FIG. 1; for example in a control packet (e.g., a probe signal or a beacon signal). Alternatively or additionally, the indication may be transmitted together with one or more (e.g., each) of the packets of the plurality.

The other transmitter apparatus may, for example, be an access point (AP) or a station (STA). Provision of the indication to the other transmitter apparatus may or may not be via other devices such as one or more control nodes.

The indication is for controlling transmission of the other packet by the other transmitter apparatus and may comprise one or more of an indication of the determined duration of time, an indication of the duration of the other packet, an indication of duration for each of the packets of the plurality of packets, and an indication of periodicity of transmission for the packets of the plurality of packets. Typically, the transmitter apparatus performing the method 100 and the other transmitter apparatus have a common time reference and the indication can be used by the other transmitter apparatus to determine when the other packet may be transmitted without interfering with the transmission of the plurality of packets.

It should be noted that when the offset is large enough, the slack can be utilized to accommodate more than one other packets between the transmission of two neighboring packets of the plurality. Thus, when the offset is equal to, or larger than, an aggregated duration of two or more other packets, the slack can be utilized to accommodate the two or more other packets between the transmission of two packets of the plurality.

In step 130, a packet of the plurality of packets is transmitted. Then, after completion of transmission of the packet, the method comprises enforcing the determined duration of time to elapse as illustrated by step 140 before transmission of a subsequent (e.g., immediately subsequent) packet of the plurality of packets is initiated. By iteration of step 130, the subsequent packet of the plurality of packets is then transmitted when the determined duration of time has elapsed. The enforcement of elapse of the determined duration of time is typically applied for each packet of the plurality of packets.

The enforcement of elapse of the determined duration of time results in transmission without latency variation provided the determined duration of time is not varied and the subsequent packet is transmitted immediately when the determined duration of time has elapsed.

If the subsequent packet is not necessarily transmitted immediately when the determined duration of time has elapsed (e.g., is transmitted in the first available time unit—slot/frame/etc.—after the determined duration of time has elapsed), the enforcement of elapse of the determined duration of time may result in transmission with limited latency variation.

It should be noted that completion of transmission of a packet may be defined as an end of the actual transmission, or as receipt of an acknowledgement of the packet, or as an end of a time-out interval for acknowledgement.

Enforcing the determined duration of time to elapse according to step 140 may typically comprise enforcing at least one silent period of the transmitter apparatus while the determined duration of time elapses, as illustrated by optional sub-step 142. Typically, the aggregated length of the silent periods enforced while the duration of time elapses is at least equal to the maximum required time for clear channel assessment. The at least one silent period may, for example, be a continuous silent period.

Alternatively, the at least one silent period may be a silent period interrupted once or more by transmissions of other packets. When slack is utilized to accommodate other packet(s) between the transmission of packets of the plurality as elaborated on above, and when the other packet(s) are to be transmitted by the transmitter apparatus performing the method 100, the method may comprise transmitting the other packet while the determined duration of time elapses as illustrated by optional sub-step 144, thereby interrupting the silence.

At completion of transmission of the packet in step 130, the method may comprise initiating a clear channel assessment procedure (for the subsequent packet of the plurality of packets) to be conducted while the determined duration of time elapses, as illustrated by optional step 150. The initiation of the clear channel assessment procedure at completion of transmission of the packet is compliant with the post back-off requirement of IEEE802.11 standard.

Since enforcement of the determined duration of time to elapse is performed after completion of transmission of the packet and initiation of the clear channel assessment procedure is performed at completion of transmission of the packet, it follows that initiation of the clear channel assessment procedure is performed not later than at the start of the elapse of the duration of time, which guarantees that the CCA procedure can be completed assuming that the channel is idle while the duration of time elapses with the exception of possible transmission of other packet(s) as described above.

Figure 2:
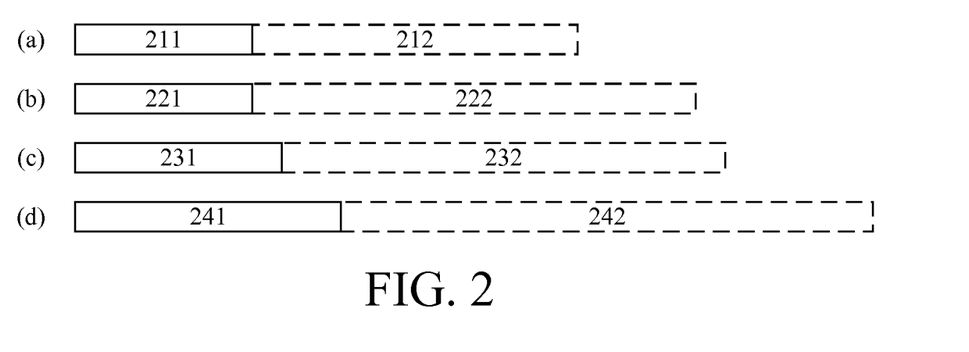
FIG. 2 is a schematic drawing illustrating example maximum required times for clear channel assessment according to some embodiments.

FIG. 2 schematically illustrates example maximum required times for CCA according to some embodiments. Four example maximum required times—for four different pluralities of packets—are denoted by (a), (b), (c), and (d), respectively.

The maximum required times of these examples are determined as a sum of a deterministic initial time period 211, 221, 231, 241 for clear channel assessment and a maximum possible subsequent time period 212, 222, 232, 242 for clear channel assessment. As exemplified in FIG. 2, either or both of the deterministic initial time period 211, 221, 231, 241 and the maximum possible subsequent time period 212, 222, 232, 242 may differ between different pluralities of packets.

As mentioned before, the deterministic initial time period and/or the maximum possible subsequent time period (e.g., a maximum integer number of a (pseudo-)random draw) may be specified in relation to a clear channel assessment access category of the plurality of packets. Thus, the maximum required times of FIG. 2 may correspond to different access categories.

Different access categories are typically associated with different probabilities to access the channel under LBT requirements. This may be achieved by assignment—to different access categories—of different lengths of the deterministic initial time periods (e.g., AIFS, DIFS) 211, 221, 231, 241 and/or of different maximum integer numbers (CW) which yields different maximum possible subsequent time periods 212, 222, 232, 242.

The example maximum required time denoted by (a) may correspond to a voice access category and may have a short deterministic initial time period 211 and a low maximum integer number yielding a short maximum possible subsequent time period 212; which together results in a relatively high probability to access the channel under LBT requirements.

The example maximum required time denoted by (b) may correspond to a video access category and may have a short deterministic initial time period 221 and a medium maximum integer number yielding a medium maximum possible subsequent time period 222; which together results in a lower probability to access the channel under LBT requirements than the voice access category.

The example maximum required time denoted by (c) may correspond to a best effort access category and may have a medium deterministic initial time period 231 and a medium maximum integer number yielding a medium maximum possible subsequent time period 232; which together results in a lower probability to access the channel under LBT requirements than the video access category.

The example maximum required time denoted by (d) may correspond to a background access category and may have a long deterministic initial time period 241 and a high maximum integer number yielding a long maximum possible subsequent time period 242; which together results in a lower probability to access the channel under LBT requirements than the best effort access category.

It should be noted that the plurality of packets referred to herein typically have the same access category.

Figure 3:
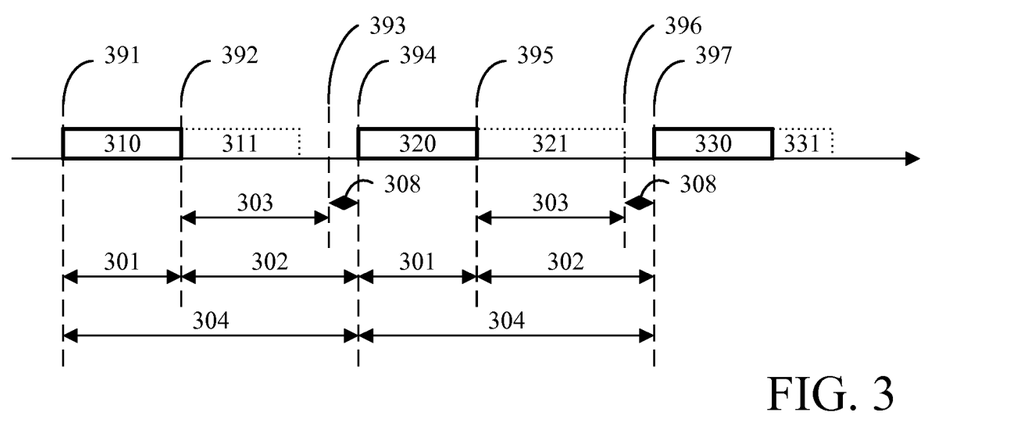
FIG. 3 is a schematic diagram illustrating example transmission of a plurality of packets according to some embodiments.

FIG. 3 is a schematic time domain illustration of example transmission of a plurality of packets according to some embodiments.

Transmission of a first packet 310 is initiated at 391 and completed at 392 (compare with step 130 of FIG. 1). The packet has a duration 301.

At the completion 392 of transmission of the packet 310, a clear channel assessment procedure 311 is initiated (compare with step 150 of FIG. 1). The clear channel assessment procedure for the plurality of packets is associated with a maximum required time 303 for clear channel assessment. Thus, the clear channel assessment procedure 311 should always be able to finish by 393. In this case, the clear channel assessment procedure 311 finishes earlier (e.g., since a drawn integer number is lower than a maximum integer number corresponding to the maximum required time 303).

After completion 392 of transmission of the packet 310, a determined duration of time 302 is enforced to elapse (to enable performance of the clear channel assessment procedure 311; compare with step 140 of FIG. 1) before transmission of a subsequent packet 320 of the plurality of packets is initiated at 394. In this example, the entire determined duration of time 302 is one continuous silent period, and the length of the duration of time 302 is equal to the maximum required time 303 plus an offset 308 which is larger than zero.

When transmission of the subsequent packet 320 is completed at 395, a further clear channel assessment procedure 321 is initiated, and the determined duration of time 302 is enforced to elapse (to enable performance of the clear channel assessment procedure 321) before transmission of a yet subsequent packet 330 of the plurality of packets is initiated at 397.

In this case, the clear channel assessment procedure 321 needs the entire maximum required time 303 for clear channel assessment (e.g., since a drawn integer number is equal to a maximum integer number corresponding to the maximum required time 303) and finishes at 396.

When transmission of the yet subsequent packet 330 is completed, a yet further clear channel assessment procedure 331 is initiated, and the determined duration of time is enforced to elapse before transmission of a further packet, and so on until all packet of the plurality have been transmitted.

Thus, the duration of time 302 between packets of the plurality is determined based on CCA requirements; it has to be long enough to accommodate the maximum required time 303 for CCA. Based on the duration of time 302 and based on latency requirements, the packet duration 301 for the plurality of packets and/or the periodicity 304 of transmission for the plurality of packets may be negotiated with an intended receiver of the plurality of packets. For example, if the intended receiver specifies that packets must be delivered with a certain minimum frequency, the periodicity 304 has an upper limit. This upper limit of the periodicity 304, together with the duration of time 302, sets a maximum possible packet duration 301.

Without the enforcement of the duration of time 302, the transmission of the subsequent packet 320 would be initiated earlier (when the CCA 311 is finished). The duration between packets would vary and a latency variation (jitter) would be experienced; contrary to the latency requirements (e.g., of applicable TSN principles). Thus, the approaches presented herein enables transmission of a plurality of packets under both clear channel assessment requirements and latency requirements.

Figure 4:
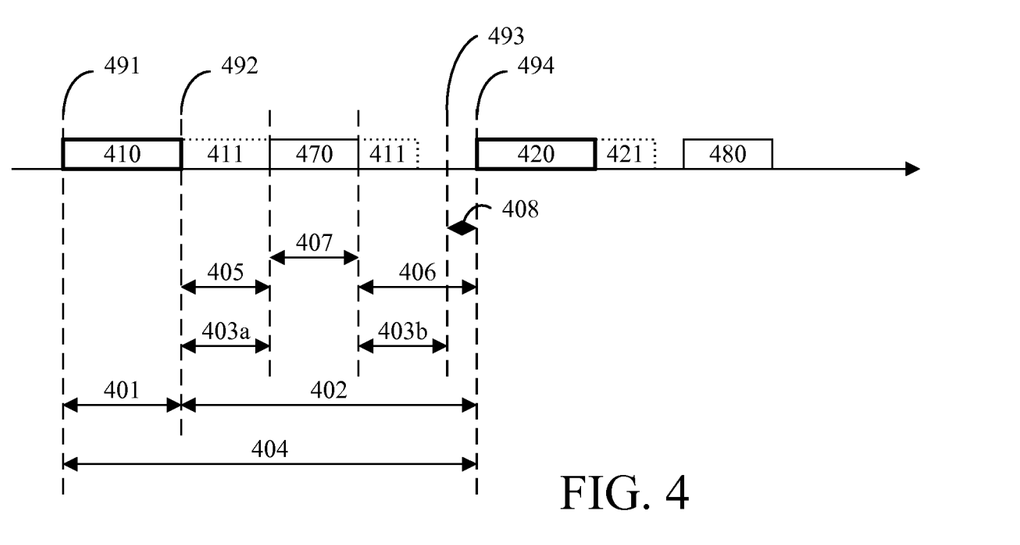
FIG. 4 is a schematic diagram illustrating example transmission of a plurality of packets according to some embodiments.

FIG. 4 is also a schematic time domain illustration of example transmission of a plurality of packets according to some embodiments. The example of FIG. 4 is similar to the example of FIG. 3 (although the actually used time for each of the CCA procedures differs from those of FIG. 3), but introduces the possibility to interleave transmission of other packets (which are not comprised in the plurality of packets) between transmissions of packets of the plurality.

Transmission of a first packet 410 is initiated at 491 and completed at 492 (compare with step 130 of FIG. 1). The packet has a duration 401.

At the completion 492 of transmission of the packet 410, a clear channel assessment procedure 411 is initiated (compare with step 150 of FIG. 1). The clear channel assessment procedure for the plurality of packets is associated with a maximum required time 403a+403b for clear channel assessment. Thus, the clear channel assessment procedure 411 should always be able to finish by 493. In this case, the clear channel assessment procedure 411 finishes earlier (e.g., since a drawn integer number is lower than a maximum integer number corresponding to the maximum required time 403a+403b).

After completion 492 of transmission of the packet 410, a determined duration of time 402 is enforced to elapse (to enable performance of the clear channel assessment procedure 411 and transmission of another packet 470 of duration 407; compare with step 140 of FIG. 1) before transmission of a subsequent packet 420 of the plurality of packets is initiated at 494. In this example, the determined duration of time 402 comprises two silent periods 405, 406, and the length of the duration of time 402 is equal to the maximum required time 403a+403b plus an offset 407+408 which is larger than the duration 407 of the other packet 470.

When transmission of the subsequent packet 420 is completed, a further clear channel assessment procedure 421 is initiated, and the determined duration of time is enforced to elapse (to enable performance of the clear channel assessment procedure 421 and transmission of yet another packet 480) before transmission of a yet subsequent packet of the plurality of packets is initiated.

In this case, the clear channel assessment procedure 421 needs just a small part of the maximum required time for clear channel assessment (e.g., since a drawn integer number is much smaller than a maximum integer number corresponding to the maximum required time).

When transmission of the yet subsequent packet is completed, a yet further clear channel assessment procedure is initiated, and the determined duration of time is enforced to elapse before transmission of a further packet, and so on until all packet of the plurality have been transmitted.

It should be noted that the packets 470 and 480 are not comprised in the plurality of packets comprising packets 410 and 420. The packets 470 and 480 may be non-related to each other or may be comprised in another plurality of packets (which may or may not be subject to—possibly different—requirements regarding latency requirements).

Figure 5:
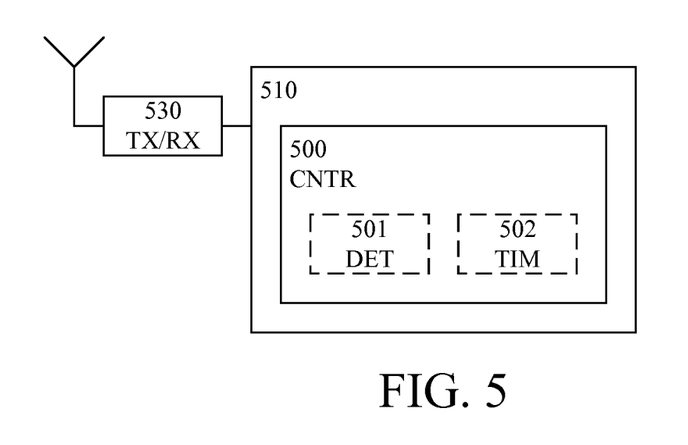
FIG. 5 is a schematic block diagram illustrating an example apparatus according to some embodiments.

FIG. 5 schematically illustrates an example latency control apparatus 510 according to some embodiments. The apparatus 510 is for a transmitter apparatus adapted for transmission of a plurality of packets under clear channel assessment requirements and latency requirements.

For example, the apparatus may be comprised in—or otherwise associated with (e.g. connectable, or connected, to)—the transmitter apparatus. Alternatively or additionally, the apparatus 510 may be comprised in—or otherwise associated with (e.g. connectable, or connected, to)—a communication device, such as a wireless communication device. The communication device may, for example, be an access point (AP) or a station (STA).

The apparatus 510 may, for example, be configured to cause performance (e.g., perform) one or more of the method steps of FIG. 1 or otherwise described herein.

The apparatus 510 comprises controlling circuitry (CNTR) 500.

The controlling circuitry is configured to cause determination of a maximum required time for clear channel assessment for the plurality of packets (compare with step 110 of FIG. 1). To this end the controlling circuitry may comprise—or be otherwise associated with (e.g. connectable, or connected, to)—a determiner (DET; e.g., determination circuitry or a determination module) 501. The determiner 501 may be configured to determine the maximum required time for clear channel assessment for the plurality of packets.

The controlling circuitry is also configured to cause determination of a duration of time related to the determined maximum required time (compare with step 120 of FIG. 1). To this end the controlling circuitry may comprise—or be otherwise associated with (e.g. connectable, or connected, to)—a determiner (DET; e.g., determination circuitry or a determination module) 501. The determiner 501 may be configured to determine the duration of time related to the determined maximum required time.

The determiner 501 may be a single determiner or may comprise two separate determiners, configured, respectively, to determine the maximum required time for clear channel assessment for the plurality of packets and to determine the duration of time related to the determined maximum required time.

The controlling circuitry is also configured to cause enforcement, for each packet of the plurality of packets, of the determined duration of time to elapse after completion of transmission of the packet, before transmission of a subsequent packet of the plurality of packets is initiated (compare with step 140 of FIG. 1). To this end the controlling circuitry may comprise—or be otherwise associated with (e.g. connectable, or connected, to)—a timer (TIM; e.g., timing circuitry or a timer module) 502. The timer 502 may be configured to enforce, for each packet of the plurality of packets, the determined duration of time to elapse after completion of transmission of the packet and before transmission of a subsequent packet of the plurality of packets is initiated.

The controlling circuitry may be further configured to cause transmission of the subsequent packet of the plurality of packets when the determined duration of time has elapsed. To this end, the controlling circuitry may also comprise—or be otherwise associated with (e.g. connectable, or connected, to)—a transmitter, illustrated in FIG. 5 as part of a transceiver (TX/RX; e.g., transceiving circuitry or a transceiver module) 530. The transmitter may be configured to transmit the packets of the plurality of packets (e.g., the subsequent packet).

Three specific embodiments will now be disclosed to further exemplify the principles presented herein.

Embodiment 1: Periodic Transmission with Minimum Periodicity (Compare with FIG. 3

To ensure that future transmission time(s) can be predicted, a minimum spacing between packets is applied to ensure that the post back-off process is finalized irrespective of the random number drawn.

As an example, suppose that distributed coordination function (DCF) is used. If the channel is idle, the time between two packets needs to be at least $$T_j = DIFS + 9\ \mu s \times RND = 34\ \mu s + 9\ \mu s \times RND$$

where $T_i$ is the required time for clear channel assessment, DIFS is the DCF inter-frame spacing, RND is a uniformly distributed random number in the interval [0 CW], and the slot length is 9 μs. It is assumed here that the system is designed such that the probability for collision is negligible, so that CW never enlarges beyond its initial value of 15.

Consequently, the largest value for $T_i$ (the maximum required time for clear channel assessment, 303) is 169 μs. According to this embodiment, a time between packets $T_j \geq T_i$ (the duration of time related to the determined maximum required time, 302) is enforced.

Thus, if packets are required (e.g., by TSN requirements) to be sent at a minimum frequency or more often (with a maximum periodicity $T_{per}$, 304—a maximum duration between the start of two consecutive packets) the duration $T_p$, 301, of a packet will be limited as $T_p \leq T_{per} - T_j$.

One advantage with a predictable transmission time is that a receiver expecting a packet may wake up only for the specific intervals when a packet is expected, rather than to wake up more often and scan for potential packets. If a packet is not received during the specific interval, the receiver can go back to sleep mode directly, rather than continuing scanning until there is a time-out for the packet. Thereby, power savings may be achieved at the receiver.

Embodiment 2: Multiple Periodic Transmissions of Same Transmitter (Compare with FIG. 4)

The possibility of having periodic transmissions of packets of a first type (410, 420, 430) as described above can be explored such that additional, possibly also periodic, transmissions of packets of a second type (470, 480) are enabled. To achieve this, it should be ensured that the time between transmissions is sufficiently large to ensure that the post back-off procedure has completed even if additional packet(s) are transmitted in the time between transmissions.

Comparing with embodiment 1, the time between packets $T_j$, 402, is increased to accommodate the other packet, 470. Thus, the accumulated duration of 405 and 406 is at least equal to $T_i$, and for a given value of $T_j$, the duration of the packet 470 must not be more than $T_j$ minus the accumulated duration of 405 and 406.

This embodiment assumes that the post back-off process can be performed for both packet types in parallel. This may, for example, be achieved by assigning the two packets types to different access categories. If the two packet types are assigned to the same access category (so that only one post back-off procedure can be executed at a time), the time between packets $T_j$ may be increased to allow both post back-off procedures to be finalized before the subsequent packet is transmitted.

It should be noted that, in some embodiments, the packet of the second type may not be periodic at all, but is merely transmitted in between packets of the first type and has a duration which is limited as described above.

It should also be noted that the packets of the second type may be periodic, but with a period which is a multiple of the period for the packets of the first time. For example, if the periodicity for the packets of the second type is twice as large as the periodicity for the packets of the first type, a packet of the second type is transmitted in every other interval between packets of the first type.

Furthermore, it should also be noted that it is possible to support more than two packet types provided the total time—within the periodicity of each of the types—when the channel is ensured to be idle is sufficiently large, so that it can be guaranteed that the post back-off procedures for all packets type will be able to finalize.

Generally, the packets of the different types may be intended for the same receiver (e.g., representing different logical links) or may be intended for different receivers. A scenario applicable in the latter case is where the different receivers are located in different machines within a factory. Then, the AP can effectively support periodic transmissions to a number of different machines.

Embodiment 3: Multiple Periodic Transmissions of Different Transmitters

In embodiment 2, where all transmissions are from the same transmitter, it is typically an internal matter for that transmitter to ensure that the total time—within the periodicity of each of the types—when the channel is ensured to be idle is sufficiently large. In this embodiment (embodiment 3) a similar approach, but with different transmitters, is discussed.

When two or more transmitters are involved in transmitting periodic (or otherwise deterministic transmissions), some kind of information exchange between the transmitter is typically needed. The information exchange may comprise that the transmitter of the first type of packets informs the other transmitter(s) about $T_{per}$ and $T_p$ for the first type of packets, and optionally also about $T_i$. Another transmitter aiming to initialize, possibly also periodic, transmission(s) may use this information to determine a maximum allowable length of a packet and/or a suitable periodicity.

As mentioned before, the information exchange may, for example, take place via one or more control packets (e.g., a probe or a beacon frame) or via inclusion in every packet of the first type. If the transmitters have a wired connection between them, the information exchange may be sent via the wired connection.

Since the packets of different types are transmitted by different transmitters in this embodiment, the post back-off process can—of course—be performed for both (or all) packet types in parallel. Thus, the different packets types may be of the same or different access categories.

Generally, when an arrangement is referred to herein, it is to be understood as a physical product; e.g., an apparatus. The physical product may comprise one or more parts, such as controlling circuitry in the form of one or more controllers, one or more processors, or the like.

The described embodiments and their equivalents may be realized in software or hardware or a combination thereof. The embodiments may be performed by general purpose circuitry. Examples of general purpose circuitry include digital signal processors (DSP), central processing units (CPU), co-processor units, field programmable gate arrays (FPGA) and other programmable hardware. Alternatively or additionally, the embodiments may be performed by specialized circuitry, such as application specific integrated circuits (ASIC). The general purpose circuitry and/or the specialized circuitry may, for example, be associated with or comprised in an apparatus such as a communication device (e.g. a station—STA—or an access point—AP).

Embodiments may appear within an electronic apparatus (such as a communication device) comprising arrangements, circuitry, and/or logic according to any of the embodiments described herein. Alternatively or additionally, an electronic apparatus (such as a communication device) may be configured to perform methods according to any of the embodiments described herein.

Figure 6:
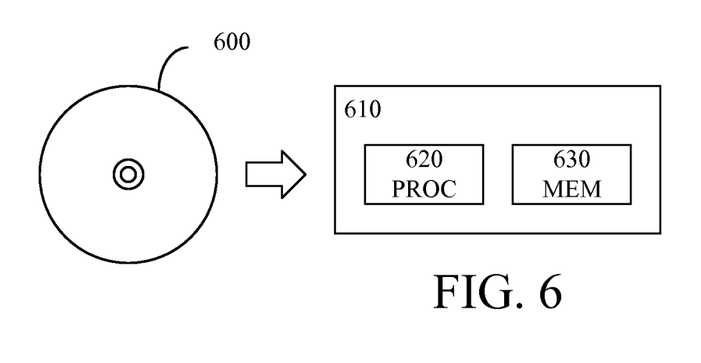
FIG. 6 is a schematic drawing illustrating an example computer readable medium according to some embodiments.

According to some embodiments, a computer program product comprises a computer readable medium such as, for example a universal serial bus (USB) memory, a plug-in card, an embedded drive or a read only memory (ROM). FIG. 6 illustrates an example computer readable medium in the form of a compact disc (CD) ROM 600. The computer readable medium has stored thereon a computer program comprising program instructions. The computer program is loadable into a data processor (PROC; e.g., data processing circuitry or a data processing unit) 620, which may, for example, be comprised in a communication device 610. When loaded into the data processor, the computer program may be stored in a memory (MEM) 630 associated with or comprised in the data processor. According to some embodiments, the computer program may, when loaded into and run by the data processor, cause execution of method steps according to, for example, any of the methods illustrated in FIG. 1 or otherwise described herein.

Generally, all terms used herein are to be interpreted according to their ordinary meaning in the relevant technical field, unless a different meaning is clearly given and/or is implied from the context in which it is used.

Reference has been made herein to various embodiments. However, a person skilled in the art would recognize numerous variations to the described embodiments that would still fall within the scope of the claims.

For example, the method embodiments described herein discloses example methods through steps being performed in a certain order. However, it is recognized that these sequences of events may take place in another order without departing from the scope of the claims. Furthermore, some method steps may be performed in parallel even though they have been described as being performed in sequence. Thus, the steps of any methods disclosed herein do not have to be performed in the exact order disclosed, unless a step is explicitly described as following or preceding another step and/or where it is implicit that a step must follow or precede another step.

In the same manner, it should be noted that in the description of embodiments, the partition of functional blocks into particular units is by no means intended as limiting. Contrarily, these partitions are merely examples. Functional blocks described herein as one unit may be split into two or more units. Furthermore, functional blocks described herein as being implemented as two or more units may be merged into fewer (e.g. a single) unit.

Any feature of any of the embodiments disclosed herein may be applied to any other embodiment, wherever suitable. Likewise, any advantage of any of the embodiments may apply to any other embodiments, and vice versa.

Hence, it should be understood that the details of the described embodiments are merely examples brought forward for illustrative purposes, and that all variations that fall within the scope of the claims are intended to be embraced therein.

The invention claimed is:

1. A latency control method of a transmitter apparatus adapted for transmission of a plurality of packets under clear channel assessment requirements and latency requirements, the method comprising:
   determining a maximum required time for clear channel assessment for the plurality of packets;
   determining a duration of time related to the determined maximum required time; and
   enforcing, for each packet of the plurality of packets, the determined duration of time to elapse after completion of transmission of the packet, before transmission of a subsequent packet of the plurality of packets is initiated.

2. The method of claim 1, further comprising transmitting the subsequent packet of the plurality of packets when the determined duration of time has elapsed.

3. The method of claim 1, wherein enforcing the determined duration of time to elapse after completion of transmission of the packet comprises enforcing at least one silent period of the transmitter apparatus while the determined duration of time elapses.

4. The method of claim 1, further comprising initiating a clear channel assessment procedure at the completion of transmission of the packet.

5. The method of claim 1, wherein determining the duration of time related to the determined maximum required time comprises negotiating, with an intended receiver of the plurality of packets and based on determined maximum required time, a duration for each of the packets of the plurality of packets and/or a periodicity of transmission for the packets of the plurality of packets.

6. The method of claim 1, wherein the latency requirements comprise requirements of a maximum latency variation.

7. The method of claim 1, wherein the maximum required time is determined as a sum of a deterministic initial time period for clear channel assessment and a maximum possible subsequent time period for clear channel assessment.

8. The method of claim 7, wherein the clear channel assessment comprises drawing an integer number from an interval ranging from zero to a maximum integer number, and wherein the maximum possible subsequent time period equals the maximum integer number multiplied by a slot duration.

9. The method of claim 7, wherein at least one of the deterministic initial time period and the maximum possible subsequent time period is specified in relation to a clear channel assessment access category of the plurality of packets.

10. The method of claim 1, wherein the duration of time is determined as being equal to the determined maximum required time plus an offset.

11. The method of claim 10, wherein the offset is equal to zero, or is equal to a positive value.

12. The method of claim 10, wherein the offset is equal to, or larger than, a duration of another packet, wherein the other packet is not comprised in the plurality of packets.

13. The method of claim 12, further comprising transmitting the other packet while the determined duration of time elapses.

14. The method of claim 12, further comprising transmitting, for provision to another transmitter apparatus and for controlling transmission of the other packet by the other transmitter apparatus, one or more of:
   an indication of the determined duration of time;
   an indication of the duration of the other packet;
   an indication of duration for each of the packets of the plurality of packets; and
   an indication of periodicity of transmission for the packets of the plurality of packets.

15. A non-transitory computer readable medium, having thereon a computer program comprising program instructions, the computer program being loadable into a data processing unit and configured to cause execution of the method when the computer program is run by the data processing unit, wherein the method is a latency control method of a transmitter apparatus adapted for transmission of a plurality of packets under clear channel assessment requirements and latency requirements, the method comprising:
- determining a maximum required time for clear channel assessment for the plurality of packets;
- determining a duration of time related to the determined maximum required time; and
- enforcing, for each packet of the plurality of packets, the determined duration of time to elapse after completion of transmission of the packet, before transmission of a subsequent packet of the plurality of packets is initiated.

16. A latency control apparatus for a transmitter apparatus adapted for transmission of a plurality of packets under clear channel assessment requirements and latency requirements, the apparatus comprising controlling circuitry configured to cause:
- determination of a maximum required time for clear channel assessment for the plurality of packets;
- determination of a duration of time related to the determined maximum required time; and
- enforcement, for each packet of the plurality of packets, of the determined duration of time to elapse after completion of transmission of the packet, before transmission of a subsequent packet of the plurality of packets is initiated.

17. The apparatus of claim 16, wherein the controlling circuitry is further configured to cause transmission of the subsequent packet of the plurality of packets when the determined duration of time has elapsed.

18. The apparatus of claim 16, wherein enforcement of the determined duration of time to elapse after completion of transmission of the packet comprises enforcement of at least one silent period of the transmitter apparatus while the determined duration of time elapses.

19. The apparatus of claim 16, wherein the controlling circuitry is further configured to cause initiation of a clear channel assessment procedure at the completion of transmission of the packet.

20. The apparatus of claim 16, wherein determination of the duration of time related to the determined maximum required time comprises negotiation, with an intended receiver of the plurality of packets and based on determined maximum required time, of a duration for each of the packets of the plurality of packets and/or of a periodicity of transmission for the packets of the plurality of packets.

21. The apparatus of claim 16, wherein the latency requirements comprise requirements of a maximum latency variation.

22. The apparatus of claim 16, wherein the controlling circuitry is configured to cause the maximum required time to be determined as a sum of a deterministic initial time period for clear channel assessment and a maximum possible subsequent time period for clear channel assessment.

23. The apparatus of claim 22, wherein the clear channel assessment comprises drawing of an integer number from an interval ranging from zero to a maximum integer number, and wherein the maximum possible subsequent time period equals the maximum integer number multiplied by a slot duration.

24. The apparatus of claim 22, wherein at least one of the deterministic initial time period and the maximum possible subsequent time period is specified in relation to a clear channel assessment access category of the plurality of packets.

25. The apparatus of claim 16, wherein the controlling circuitry is configured to cause the duration of time to be determined as being equal to the determined maximum required time plus an offset.

26. The apparatus of claim 25, wherein the offset is equal to zero, or is equal to a positive value.

27. The apparatus of claim 25, wherein the offset is equal to, or larger than, a duration of another packet, wherein the other packet is not comprised in the plurality of packets.

28. The apparatus of claim 27, wherein the controlling circuitry is further configured to cause transmission of the other packet while the determined duration of time elapses.

29. The apparatus of claim 27, wherein the controlling circuitry is further configured to cause transmission, for provision to another transmitter apparatus and for controlling transmission of the other packet by the other transmitter apparatus, of one or more of:
- an indication of the determined duration of time;
- an indication of the duration of the other packet;
- an indication of duration for each of the packets of the plurality of packets; and
- an indication of periodicity of transmission for the packets of the plurality of packets.

30. A transmitter apparatus comprising the apparatus of claim 16.

31. A communication device comprising the apparatus of claim 16.

32. The communication device of claim 31 wherein the communication device is an access point or a station.

* * * * *